United States Patent
Curtis

(10) Patent No.: US 8,446,652 B2
(45) Date of Patent: May 21, 2013

(54) IMAGE QUALITY MONITORING AND TAGGING AT SCAN TIME

(75) Inventor: Donald B. Curtis, Highland, UT (US)

(73) Assignee: Ancestry.com Operations, Inc., Provo, UT (US)

(*) Notice: Subject to any disclaimer, the term of this patent is extended or adjusted under 35 U.S.C. 154(b) by 1303 days.

(21) Appl. No.: 11/750,191

(22) Filed: May 17, 2007

(65) Prior Publication Data

US 2008/0285092 A1 Nov. 20, 2008

(51) Int. Cl.
*H04N 1/46* (2006.01)

(52) U.S. Cl.
USPC .......... 358/505; 358/1.16; 358/501; 358/504; 358/518; 358/520; 382/112; 382/167; 382/255; 382/305; 382/319; 399/32; 399/39; 399/47; 399/49

(58) Field of Classification Search
USPC ............... 358/474, 1.9, 1.15, 1.2, 2.1, 1.13, 358/1.16, 501, 504, 505, 518, 519, 520, 521, 358/523, 401; 382/112, 167, 255, 305, 307, 382/319; 399/32, 39, 47, 49
See application file for complete search history.

(56) References Cited

U.S. PATENT DOCUMENTS

| | | | |
|---|---|---|---|
| 6,480,304 B1 * | 11/2002 | Os et al. | 358/474 |
| 7,065,716 B1 * | 6/2006 | Rzepkowski et al. | 715/839 |
| 2005/0128527 A1 | 6/2005 | Brawn et al. | |

* cited by examiner

*Primary Examiner* — Vu B Hang
(74) *Attorney, Agent, or Firm* — Kilpatrick Townsend Stockton, LLP

(57) ABSTRACT

A method of processing a plurality of source documents into scanned images of the source documents includes evaluating the plurality of source documents to thereby assign one or more source document quality metrics indicative of source document image quality. The plurality of source documents are comprised by a project and the source documents of the project are from a common source document type. The source document types include, for example, book pages, paper documents, microfilm documents, machine-printed documents, handwritten documents, print media documents, public records, microfiche documents, and/or the like. The method also includes scanning each of the plurality of source documents to thereby create one or more electronic image files comprising the scanned images and coupling the source document quality metrics to the electronic image files such that the source document quality metrics are thereafter accessible for post-production activities.

14 Claims, 3 Drawing Sheets

IMAGE QUALITY MONITORING AND TAGGING AT SCAN TIME

FIELD OF THE INVENTION

Embodiments of the present invention relate generally to scanning systems. More specifically, embodiments of the invention relate to systems and methods for monitoring the quality of scanned images and source documents and tagging the scanned images accordingly.

BACKGROUND OF THE INVENTION

Digitization of documents, such as historical documents, provides on-line customers with ready access to those documents. Digitizing the images typically involves: scanning documents, whether they be from paper, books, microfilm, and/or the like; performing image processing on the documents to improve them in some way or ways; checking the images for quality problems (i.e., quality assurance, or QA); rescanning the images if quality is insufficient; and/or the like.

Often images are indexed in some way (e.g., manually by keying operators or using optical Character recognition (OCR)) to provide search or browse mechanisms for users to find the appropriate images.

An image may be rejected for poor quality by a QA operator, by a keying operator, by an OCR engine, or even by a customer. The later in the pipeline that an image rescan is requested, the costlier the rescan is generally, because of all the work that has already been put into that image that now must be redone. Source documents may be difficult or even impossible to obtain again, making initial image quality more important. Hence, improved scanning systems and methods are needed.

BRIEF SUMMARY OF THE INVENTION

Embodiments of the present invention provide a method of processing a plurality of source documents into scanned images of the source documents. The method includes evaluating the plurality of source documents to thereby assign one or more source document quality metrics indicative of source document image quality. The plurality of source documents are comprised by a project and the source documents of the project are from a common source document type. The source document types include, for example, book pages, paper documents, microfilm documents, machine-printed documents, handwritten documents, print media documents, public records, microfiche documents, and/or the like. The method also includes scanning each of the plurality of source documents to thereby create one or more electronic image files comprising the scanned images and coupling the source document quality metrics to the electronic image files such that the source document quality metrics are thereafter accessible for post-production activities.

In some embodiments the method includes using the source document quality metrics prior to scanning to determine target quality metrics for the scanned images. The method also may include using the source document quality metrics prior to scanning to set scanning parameters of a scanning device. The method may include during the scanning step, monitoring scanned image quality metrics in relation to the target quality metrics and adjusting scanning parameters of a scanning device in accordance with the monitoring step. The source document quality metrics include, for example, color range, grayscale range, luminosity, contrast, noisiness, and/or the like. The method also may include using the scanned image quality metrics to estimate a cost of post-production activities. The method may include using the source document image quality metrics to decide whether to request a document to be rescanned. The method also may include using the scanned image quality metrics to determine a level of effort required to perform optical character recognition of the scanned image. The method may include using the scanned image quality metrics to identify a type of post-production processing that will improve the quality of the scanned images. The scanning parameters of a scanning device may include lamp brightness, contrast, and/or the like.

Other embodiments provide a production document scanning system. The system includes one or more scanning devices configured to create electronic files that include images of scanned documents. The system also includes a pre-scan, source document quality assessment process configured to generate one or more source document quality metrics indicative of source document image quality and to determine target image quality metrics for scanned documents and an arrangement, coupled with one or more of the scanning devices, configured to provide feedback to a scanning device operator. The feedback provides scanned image quality metrics indicative of scanned image quality. The system also includes an arrangement configured to couple the source document quality metrics to the electronic files to thereby make the source document quality metrics accessible during post-production activities.

In some embodiments, the arrangement configured to couple the source document quality metrics to the electronic files is further configured to couple the target image quality metrics to the electronic files. The arrangement configured to couple the source document quality metrics to the electronic files may be further configured to couple the scanned image quality metrics to the electronic files. The system may include an arrangement configured to control scanning parameters in relation to the source document quality metrics, target image quality metrics, and/or post production activities. The post-production activities may include machine-implemented optical character recognition, manual keying of document data, presentation to users, and/or the like.

Still other embodiments provide a method of scanning source documents. The method includes evaluating the source documents to thereby assign one or more source document quality metrics indicative of source document image quality, using the source document quality metrics prior to scanning to determine target quality metrics for the scanned images, using the source document quality metrics prior to scanning to set scanning parameters of a scanning device, scanning each of the plurality of source documents to thereby create one or more electronic image files comprising the scanned images, during the scanning step, monitoring scanned image quality metrics in relation to the target quality metrics, adjusting scanning parameters of a scanning device in accordance with the monitoring step and coupling one or more of the source document quality metrics, the target quality metrics, the scanning parameters, and the scanned image quality metrics to the electronic image files such that the quality metrics are thereafter accessible for post-production activities.

The plurality of source documents may be part of a project and the source documents of the project may be from a common source document type including, for example, book pages, paper documents, microfilm documents, machine-printed documents, handwritten documents, print media documents, public records, microfiche documents, and/or the like. The source document quality metrics may be, for example, color range, grayscale range, luminosity, contrast, noisiness, and/or the like. The method may include using the source document image quality metrics during post-production activities to decide whether to request a document to be rescanned. The scanning parameters of a scanning device may include lamp brightness, contrast, and/or the like.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
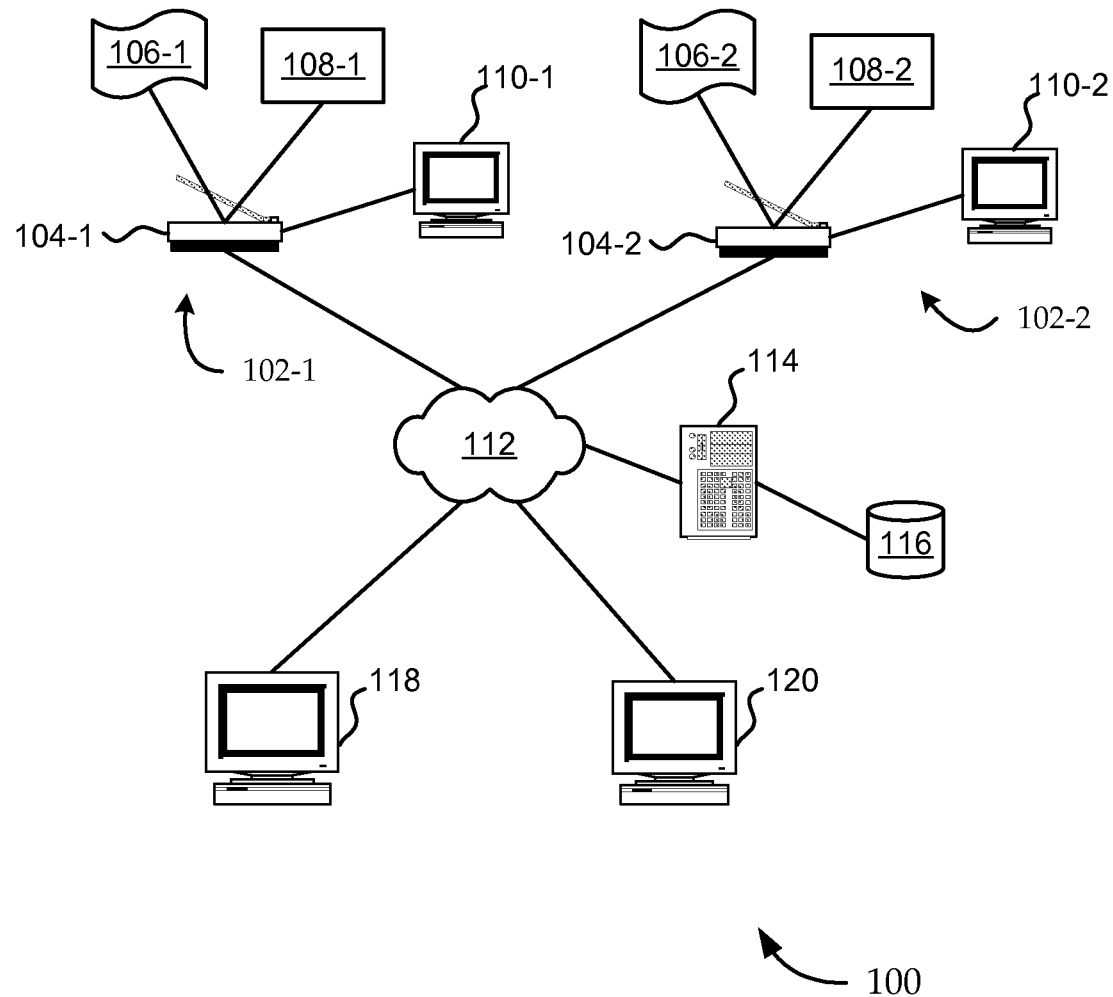
FIG. 1 illustrates an exemplary production scanning system according to embodiments of the invention.

Embodiments of the present invention relate to document scanning systems and methods. In order to provide a context for describing embodiments of the present invention, embodiments of the invention will be described herein with reference to scanning documents, which may include books, public records, paper documents, microfilm or microfiche documents, and/or the like. Those skilled in the art will appreciate, however, that other embodiments are possible. For example, embodiments of the invention may be used to collect scanned images from other sources.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention relate to improving the quality of document scanning and/or improving the efficiency of production scanning processes. While some scanner software packages have the capability to analyze a source document to determine how that document should be scanned, based on certain metrics and goals for image quality, those metrics and goals are generally not configurable and are often insufficient for certain projects and certain media types. For example, if an image of machine-printed content is going to be OCR-processed, it may be desirable for its scan to be high-contrast, but for an image of a historical hand-written document, a high-contrast scan may lose the subtle differences between the light, hand-written strokes and the background of the document. So there is not a one-size-fits-all solution for determining the optimal way to perform a scan of an arbitrary document. This means that an image digitization process that scans multiple image types cannot rely on automatic scanner settings to get optimal digitized images in all cases.

Another problem with automatic scanner adjustments occurs with high-speed scanners such as microfilm scanners, because the latency between recognizing how bright the lamp should be for an image and actually achieving the appropriate lamp setting is so great that the lamp cannot keep up with the scanner (several more images have already been scanned before the lamp is corrected) and slowing down the process would dramatically reduce throughput. This is a particular problem for rolls of microfilm that have a high-frequency of different document types or document quality.

One technique that may be used is for an expert scanner operator to scan a sample of documents for a particular project and create a set of configuration parameters for other scanner operators to use, based on the sampling results. This works well for a project with relatively homogeneous content and not as well with a project whose content has more variation.

Another possibility is to create the best configuration settings possible for a project and then use image processing techniques to improve image quality after the documents have been scanned. This is relatively successful for images that need marginal quality improvement. But image processing can only improve a poor-quality image so much and may not be able to raise the quality sufficiently for keyers and OCR engines and customers. Also, scanners often have access to more color information than the image files they create. For example, a grayscale microfilm scanner may generate 10 bits of data per pixel, but the output image may contain only 8 bits of data per pixel. This means that setting a scanner to the optimal settings for an image has the potential for a higher quality image than manipulating the lower-resolution data the scanner produces.

According to embodiments of the invention, the quality of a source document, or many source documents within a scanning project, is/are evaluated and the results of the evaluation are preserved with a scanned image of the document or documents. This is beneficial for a number of reasons. For example, post-scanning activities may not be performed until will after many scanned images are captured from a number of source documents. More specifically, activities such as data extraction using optical character recognition, manual keying and the like may not be performed until all documents in an entire project are scanned. In some cases, scanned image quality assurance (QA) is not performed until well after all source documents in the project are scanned. Hence, it is possible that poor scanned image quality is not detected until well after the source documents are unavailable. It may be the case, however, that the poor quality scanned image represents the best possible scanned image that could be achieved from the source document. By evaluating the quality at scan time and preserving this information with the scanned document, inefficient rescanning requests may be minimized. Moreover, pre-scanning image quality assessment allows scanning operations to be optimized according to the quality of the source document.

According to further embodiments of the invention, quality metrics for a scanning project are determined based on the pre-scan assessment of the project source documents. The metrics may include expected quality level of the scanned images. The metrics are then used as the project is scanned to adjust scanning parameters of the scanning device as scanning continues. The quality of the scanned image, the expected quality of the scanned image, and/or other metrics are stored with the resulting image files for post-production activities.

Exemplary quality metrics may include: the range of color or gray values captured in the image (e.g., as a percentage of the possible range); the relative luminosity (brightness or darkness) of the image; the relative contrast (e.g., between foreground and background) of an image; the noisiness of the image; and/or the like. As documents are scanned, quality information may be presented to a scanner operator for comparison to the expected quality metrics. This may be presented, for example, as a graph, a color system (e.g., green, yellow, and red for good, fair, and bad), etc. The operator can then use the information to make adjustments.

In addition to minimizing rescan requests for images not expected to be improvable, quality metrics also may be used to more efficiently estimate costs for post-scanning processes. For example, extracting information from lesser quality images is more costly. Knowing the quality of the image at the time of estimating more effectively manages expectations. Other advantages according to some embodiments also may be realized. Tagging images with quality level, for example, enables post-production processes such as image processing, QA, manual image editing, and the like to readily identify which images to focus on and potentially on what types of processing will be required to improve those images. Monitoring and adjusting for the quality level at scan time can dramatically reduce the time required for QA, image editing, and keying. It can also significantly reduce the frequency and cost of rework (e.g., rescans) and thus enable a net increase in throughput of the over-all process of producing images with their indexes for customers. Keeping track of quality metrics for images and projects provides a mechanism for communicating information about images and projects that can be used in planning, cost-estimating, and optimizing down-stream processes. Other tangible benefits may include lower training costs for scanning operators (because of the immediate quality feedback), greater consistency in image quality, and greater customer satisfaction.

Having described embodiments of the present invention generally, attention is directed to FIG. 1, which depicts an exemplary scanning production system 100 according to embodiments of the invention. Those skilled in the art will appreciate that the system 100 is merely exemplary of a number of possible embodiments. The system 100 includes two scanning processes 102 that include scanners 104. The scanning processes may be configured to scan images from microfilm or microfiche 106, paper documents 108, books, public records, historical documents, and/or the like. The scanning processes also include an operator workstation 110, which may be integral with the scanner 104.

Using the operator workstation, an operator is able to set or adjust target image quality levels of scanned images based on the quality of source documents, set or adjust scanning parameters or the scanning device, observe the quality of scanned images, compare the scanned image quality to target scanned image quality, and/or the like. As images are scanned, the resulting electronic image files may be tagged with any or all of the foregoing information.

Image files and/or quality metrics may be sent via a network 112 to a server 114 and stored in a database 116 for further processing or use. While the quality metrics may be stored as part of an image file, this is not necessarily the case. The quality metrics may be stored in a separate file associated with the image file. In either case, however, the images and quality metrics are available to post-production activities. For example, the images may be available to a quality assurance workstation 118, a data extraction workstation 120 (e.g., OCR, manual keying, etc.), and/or the like.

The system 100 may be used to process documents as "projects." A project is, for example, a group of source documents to be scanned. Projects may include documents of a common source document type. For example, source document types may be pages of a book, paper documents, microfilm images, microfiche images, and/or the like. Although not essential, it is helpful for a project to include similar documents so that consistent quality metrics may be determined for an entire project as will become clear from the ensuing description.

Figure 2:
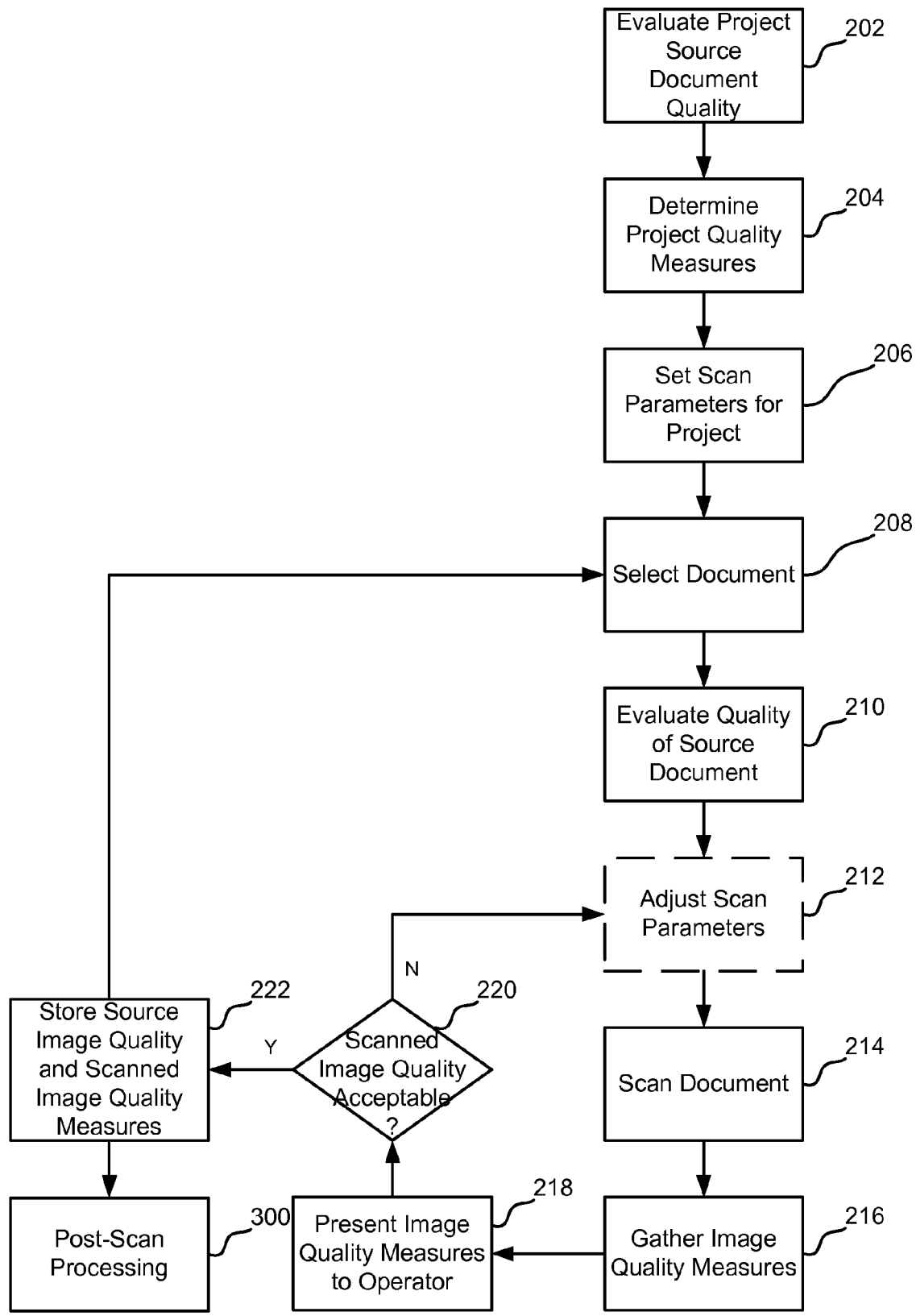
FIG. 2 depicts an exemplary production scanning method according to embodiments of the invention, which method may be implemented in the system of FIG. 1.

Having described an exemplary system according to embodiments of the invention, attention is directed to FIG. 2, which depicts an exemplary method 200 according to embodiments of the invention. The method 200 may be implemented in the system 100 of FIG. 1 or other appropriate system. Those skilled in the art will appreciate that other methods according to other embodiments may have more, fewer, or different steps than those illustrated and described herein. Moreover, other embodiments may traverse the steps in other orders than illustrated and described herein.

The method 200 begins at block 202 at which point the quality of source documents is evaluated. This could be done visually, electronically, mechanically, and/or the like. For example, an analyst could create a project record that indicates for the majority of the project the medium (paper, film, etc.), the form (bound, loose, multi-image, etc.), the content (handwriting, typeset, etc.), the general quality (uniform, illegible, etc.), the condition (intact, stained, tattered, etc.), and/or the like. The foregoing is merely exemplary. Then the project or a portion thereof could undergo a cursory or analytical scan to measure one or more quality parameters of the source documents. This may include color or grayscale range, luminosity, contrast, noisiness, etc. The source document quality assessment is saved for future use.

The source document quality assessment may be used to determine expected quality metrics for the project at block 204. These expected quality metrics may be a range that includes the values obtained during the initial quality assessment. In other embodiments, the quality assessment may be obtained using baseline scanner settings. Using project-specific settings, however, higher target quality metrics may be possible. Hence, the target quality level for the project may be higher. The target quality level for the project is saved for future use.

At block 206, the source document quality assessment and/or target quality level are used to set the scan parameters of the scanning device for the project. This may include establishing a scanned image quality range that may be monitored by the operator as the project is progressing. The parameters may be entered by an operator or provided electronically to the scanner.

Production begins with selection of a document at block 208. At block 210 the quality of the document may be evaluated in a manner similar to the initial assessment performed for the entire project. While this step may be unnecessary, including it may improve individual document quality. For example, the scan parameters may be adjusted at block 212 to optimize the scan of the document within the project.

At block 214, the document is scanned. At block 216, image quality metrics for the document are gathered, and these metrics are presented to the operator at block 218. As discussed previously, the quality metrics may be presented graphically or in any of a number of other convenient ways to thereby allow rapid response.

At block 220, a decision is made whether the scanned image is of acceptable quality. If not, the scan parameters may be adjusted at block 212 and the document scanned again. The adjusted parameters may thereafter apply to the entire project or simply to the present document. If, however, the scanned image quality is acceptable, the process continues at block 222. At this location, the various metrics for a document are gathered and stored, either in the same file as the image or in a related file that is accessible in connection with the image. The process may then return to block 208 at which location another document in the project is selected. Alternatively or additionally, the process may continue at block 300, at which various post-production activities take place as will be described hereinafter with reference to FIG. 3.

It should be appreciated that the method 200 is merely exemplary. In other embodiments, for example, production scanning proceeds rapidly, and an operator is unable to individually assess document images. According to embodiments of the present invention, however, project quality metrics may be accumulated and displayed to the operator. The operator may adjust scan parameters for future scans, but previously-scanned documents are not rescanned unless the quality level of the project has departed significantly from the expected quality level. Other tradeoffs may be made to maximize the efficiency of the overall operation.

Figure 3:
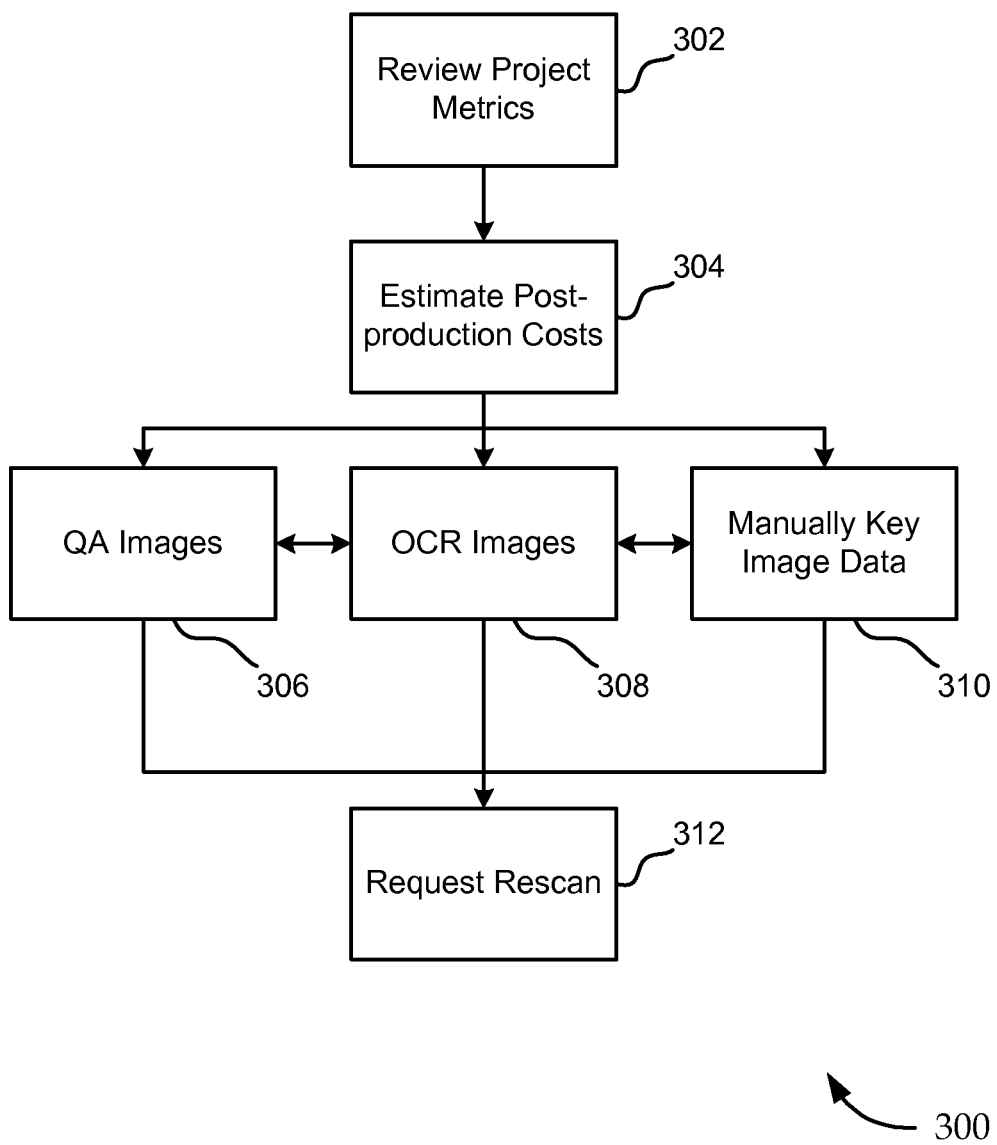
FIG. 3 depicts an exemplary post-production method that utilized production quality metrics collected according to the embodiment of FIG. 2.

Attention is directed to FIG. 3, which depicts an exemplary post-production method 300 that advantageously uses the production quality metrics collected according to the method 200. At block 302, project metrics are retrieved and reviewed. This may include quality metrics for the source documents, target quality metrics for the project, scanning parameters of the scanning device used to acquire the images, a comparison for how the actual quality of the images compares with the target image quality, and/or the like.

At block 304, any or all of the project metrics are used to estimate the costs of post-production. This also may include selecting an appropriate post production activity based on the image quality. For example, it may be determined that machine-implemented optical character recognition may be possible or that, because of the image quality, manual keying of image data may be required. Other possibilities exist.

At block 306, document images may undergo a quality assurance (QA) process. During this process, a QA technician observes one or more document images in a project and determines whether the documents are of suitable quality. This determination may be aided by the project metrics that are available to the QA technician. For example, an otherwise sub-quality image may be determined to be of sufficient quality because the project metrics note that the source image is of inferior quality.

At block 308, document images are subjected to a machine-implemented optical character recognition (OCR) process. Once again, the OCR process may be aided by the project quality metrics. Similarly, at block 310, operators may manually key data from the document images, the efficiency of which also may be improved using the project quality metrics. It should be appreciated that a document or project may undergo any of the aforementioned activities, or any combination thereof. Other post-production activities also may be included.

At block 312, a rescan request is generated. A rescan request may result from any of the aforementioned activities. Advantageously, however, rescan requests may be minimized, according to embodiments of the present invention, by referencing the project image quality metrics to thereby determine if the quality of the source document may enable a higher quality document image. If not, a rescan request is not generated, thereby improving the efficiency of the production scanning process.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of processing a project having a plurality of source documents into scanned images of the source documents, comprising:

scanning, with at least one scanner device, at least two source documents of the project to produce a digital scanned image for each of the at least two source documents;

analyzing, with at least one processor, each of the scanned images to measure at least one characteristic of each of the at least two source documents;

determining, with the at least one processor, a range of characteristics based on the measured characteristics, wherein the range of characteristics is bound by a highest measured characteristic and a lowest measured characteristic, and encompasses the measured characteristic for each of the at least two source documents;

storing, on at least one storage medium, source document quality metrics for the project, the source document quality metrics comprising the range of characteristics;

scanning, with the at least one scanner device, each of the plurality of source documents in the project a second time to create a second set of electronic image files representative of all physical documents from the project; and storing, on the at least one storage medium, the one or more electronic image files and a relationship of the one or more electronic files to the source document quality metrics, wherein the at least one characteristic comprises a selection from a group consisting of: color range; grayscale range; luminosity; contrast and noisiness.

2. The method of claim 1, further comprising, using the source document quality metrics prior to the second scanning step to determine target quality metrics for the scanned images.

3. The method of claim 1, further comprising, using the source document quality metrics prior to the second scanning step to set scanning parameters of a scanning device.

4. The method of claim 2, further comprising:
during the second scanning step, determining scanned image quality metrics;
comparing the scanned image quality metrics to the target quality metrics; and
during the second scanning step, adjusting scanning parameters of a scanning device based at least in part on the comparison of the scanned image quality metrics to the target quality metrics.

5. The method of claim 1, further comprising:
during or after the second scanning step, determining scanned image quality metrics;
using the scanned image quality metrics to estimate a cost of post-production activities.

6. The method of claim 1, further comprising, using the source document image quality metrics to decide whether to request a document to be rescanned.

7. The method of claim 1, further comprising:
during or after the second scanning step, determining scanned image quality metrics;
using the scanned image quality metrics to determine a level of effort required to perform optical character recognition of the scanned images.

8. The method of claim 1, further comprising:
during or after the second scanning step, determining scanned image quality metrics;
using the scanned image quality metrics to identify a type of post-production processing that will improve the quality of the scanned images.

9. The method of claim 3, wherein the scanning parameters of the scanning device include one or more selections from a group of scanning parameters of a scanning device, consisting of: lamp brightness and contrast.

10. A production document scanning system, comprising:
one or more electronic scanning devices configured to create electronic files from physical documents; and a source document quality assessment subsystem having a processor configured to:

receive from the one or more scanning devices a first set of electronic files, the first set of electronic files representative of at least two physical documents of a project comprising a plurality of physical documents;

analyze the first set of electronic files to measure at least one characteristic of each of the at least two physical documents;

determine a range of characteristics based on the measured characteristics, wherein the range of characteristics is bound by a highest measured characteristic and a lowest measured characteristic, and encompasses the measured characteristic for each of the at least two source documents;

store, on at least one storage medium, source document quality metrics for the project, the source document quality metrics comprising the range of characteristics;

receive a second set of electronic files from the one or more scanning devices representative of all physical documents from the project; and cause the second set of electronic files to be stored with a relationship of the second set of electronic files to the source document quality metrics, wherein the at least one characteristic comprises a selection from a group consisting of: color range; grayscale range; luminosity; contrast and noisiness.

11. The production document scanning system of claim 10, wherein the one or more processors are further configured to:
determine target image quality metrics based at least in part on the one or more source document quality metrics; and
couple the target image quality metrics to the second set of electronic files.

12. The production document scanning system of claim 10 further comprising an arrangement configured to control scanning parameters in relation to one or more of source document quality metrics, and post production activities.

13. The production document scanning system of claim 12, wherein the post-production activities comprise one or more selections from a group of post-production activities consisting of: machine-implemented optical character recognition, manual keying of document data, and presentation to users.

14. A method of processing a project having a plurality of source documents into scanned images of the source documents, comprising:

scanning, with at least one scanner device, at least two source documents of the project to produce a digital scanned image for each of the at least two source documents;

analyzing, with at least one processor, each of the digital scanned images to measure at least one characteristic of each of the at least two source documents, wherein the at least one characteristic comprises a selection from a group consisting of:
color range;
grayscale range;
luminosity;
contrast; and
noisiness;

determining, with the at least one processor, a range of characteristics based on the measured characteristics, wherein the range of characteristics is bound by a highest measured characteristic and a lowest measured characteristic, and encompasses the measured characteristic for each of the at least two source documents;

storing, on at least one storage medium, source document quality metrics for the project, the source document quality metrics comprising the range of characteristics;

scanning, with the at least one scanner device, each of the plurality of source documents in the project a second time to create a second set of electronic image files representative of all physical documents from the project; and storing, on the at least one storage medium, the one or more electronic image files and a relationship of the one or more electronic image files to the source document quality metrics.

\* \* \* \* \*